UNITED STATES PATENT OFFICE.

MAXWELL O. JOHNSON, OF WAIPIO, TERRITORY OF HAWAII.

FERTILIZING MATERIAL AND PROCESS OF PRODUCING SAME.

1,370,117.         Specification of Letters Patent.         Patented Mar. 1, 1921.

No Drawing. Original application filed September 12, 1919, Serial No. 323,234. Divided and this application filed December 15, 1919. Serial No. 344,913.

*To all whom it may concern:*

Be it known that I, MAXWELL O. JOHNSON, a citizen of the United States, residing at Waipio, in the county of Honolulu, Territory of Hawaii, have invented certain new and useful Improvements in Fertilizing Materials and Processes of Producing Same, of which the following is a specification.

The invention relates to the treatment of fruit juice and more particularly to a process of treating fruit juice whereby certain waste or by-products, especially those rich in nitrogens, are gathered together and separated out for use as a fertilizer.

Further objects and advantages of the invention will be set forth in part hereinafter, and in part will be obvious herefrom, or may be learned by practice with the invention; the same being realized and attained through and by means of the steps and instrumentalities pointed out in the appended claims.

The invention consists in the novel steps, sequence of steps, processes and articles or products herein set forth and described.

The process which is set forth hereinafter is primarily directed to the production of concentrated fruit juice as a beverage, syrup or other article of commerce, and secondarily is directed to the production, as a by-product, of the fruit juice process just described, of a fertilizing material.

This fertilizing material is very rich in nitrogen and consists entirely of materials which are waste so far as the fruit juice is concerned; that is, it consists of materials or substances which are originally in the fruit juice and which must be removed therefrom to constitute the fruit juice an acceptable article both commercially and as a comestible. Together therewith are also one or more substances employed as filtration media, that is, materials or substances introduced into the fruit juice to effect or facilitate the filtration thereof.

The process will be described as applied to the extraction and subsequent treatment of pineapple juice, although the invention in its broader aspects is applicable to other kinds of fruit juices.

This application is a division of my copending application Ser. No. 323,234, filed September 12, 1919.

The essential steps of the fruit juice treating process, in so far as the securing of the fertilizing material as a by-product is concerned is the coagulation of the proteids, rich in nitrogen, which are in the fruit juice, and therewith the other solid and fibrous matters which are in suspension in the fruit juice and which are essential to be removed therefrom. These materials are also rich in nitrogen and likewise of great value as a fertilizer. Therewith also is usually one or more materials which may be called a filtration medium or media, that is, one or more materials or substances which are utilized to gather the proteids and other substances referred to as being in suspension in the fruit juice. This filtration medium not only acts to gather or collect these substances out of the fruit juice preparatory to filtration, but also holds them and thereby prevents the fouling and stopping of the filters by said materials or substances.

I will take by way of example the processing of pineapple juice, and beginning with the expression of the juice from the fruit.

In the usual commercial process of canning pineapples, large quantities of the juice are produced, which are not utilized in the canning process. In the canning process also a very considerable portion of the pineapples is not utilized, and is merely waste so far as the canning is concerned, as only the central part of the fruit is cored out in disk form and canned. By the present process, the waste or surplus juice resulting from the coring of the fruit for canning, and also the juice from the waste or unused portions of the pineapple is saved. The juice used may therefore be that which is usually waste from the canning process. It will be clear, of course, that the entire fruit may be utilized if desired, and the treatment of the juice be entirely independent of the canning of the fruit. With other fruits the process of juice extraction will be varied in ways which are well understood by those skilled in the art. The juice is concentrated preferably without boiling down, or employing other or like steps which destroy the characteristic flavor of the pineapple, or other fruit, which deterioration is probably caused by the evaporation or breaking down of essential or other organic compounds which impart the characteristic flavors to the various fruits.

The juice is extracted from the fruit and usually concentrated in a suitable manner. For most uses, it is desirable or necessary to clarify the concentrated juice, as in the case of pineapple, the juice obtained by the concentration process is a brown colored, cloudy and slightly viscous liquid. In the clarification of pineapple juice I have found it preferable to add to the juice diatomaceous earth, and then to heat, settle and filter the juice. Diatomaceous earth, such as kieselguhr, silicious earth or filter cel, assists greatly the filtration of the concentrated juice. Soft particles are formed by the coagulation of the proteids upon heating pineapple juice, which particles clog the filters unless some filtration aid is added. Other clarification agents that might be used are kaolin, Spanish clay, casein, egg albumen, etc. In practice I have found it desirable to use between one and three per cent. of diatomaceous earth, although this proportion or percentage may be very widely varied.

To assist both in the clarification of the juice and to secure or effect rapid filtration, heating is desirable, and with many juices it is practically necessary. Pineapple juice, and other fruit juices as well, contain a considerable quantity of proteid and possibly other matter which is coagulated by heat. As a practical step in commercial manufacture, the hot juice may be settled prior to and as an aid to filtration, although this step may be dispensed with. After settling, the juice may be decanted or siphoned to the filters. In the process or step of filtration, and referring to pineapple juice as an example, the commercial filters known as Karl Kiefer filters may be employed with paper pulp pads, although other apparatus or devices may be employed with equally satisfactory results and with other juices. Also with certain juices and in certain cases, careful settling and decanting or siphoning may be substituted for the filtering, although in most cases the filtering will be found most satisfactory.

The sludge or residue from the filtration in a commercial plant has considerable value, and may be utilized as a fertilizer. The settlings from the concentrated juice will consist of the diatomaceous earth, the coagulated proteid and other matters in the pineapple juice and also any fiber and other solid matter formerly in suspension in the fresh juice. This will form a sludge which will hold a considerable portion of the concentrated juice. As it is desirable to recover this juice, and as the coagulated proteid will contain a high percentage of nitrogen and be valuable as a fertilizer if separated from the juice, it is desirable to separate the liquid and solid portions of the sludge as thoroughly as possible. This may be done in any suitable manner so far as concerns many features of the invention. One manner of effecting this would be to put the sludge through an ordinary plate and frame filter press, or other filter press adapted to the handling of press cakes. If the filtered juice from the sludge is of good enough quality, and the press is protected from the action of the acid juice, the juice can be added directly to the large bulk of juice from the Karl Kiefer filter, already referred to.

If the juice filtered from the sludge is not perfectly clear, but is uncontaminated by the press, it can be added to the next batch of juice in the settling tanks.

If the juice is contaminated by the press or is not of as good quality as desired, it can be limed with burnt lime, milk of lime or carbonate of lime, and filtered after heating and settling. The citrate of lime can be separate as a valuable by-product and the syrup obtained used for canned goods or possibly marketed directly as a syrup. The sludge can be limed directly, heated and put through the filter press and the syrup used as described above, or as hereinafter described.

After as much as possible of the concentrated juice in the sludge is drained off in the filter press, the press cake should be washed. If the juice is uncontaminated by the press, and no liming is resorted to previous to filtration, the first washing can be added to the fresh juice in the ice cans, as the washing water will probably dilute the remaining concentrated juice in the sludge to about the strength of fresh juice. After the press cake has been washed it can be applied directly to the fields as a fertilizer, or it may be first dried, and used or sold as a fertilizer. This cake or leavings of the filter press, as stated, consists largely of the coagulated proteids from the juice, and fibrous and other solid matter in mechanical suspension in the juice. The clarification of the juice may precede the concentration thereof, should this be desired, but this is not economical by reason of the much greater quantity of liquid which would have to be filtered or otherwise handled.

It will be understood that the invention is applicable to other fruit juices and that departures may be made from the described manner of carrying out the invention within the scope of the accompanying claims without departing from the principles of the invention and without sacrificing its chief advantages.

What I claim is:—

1. As an article of commerce, a fertilizer consisting of a compressed cake comprising vegetable fibrous and fruity matter and coagulated vegetable proteids.

2. The process of producing a fertilizer as a by-product which comprises coagulating the proteids contained in fruit juice, introducing a filtration medium into the fruit juice, and filtering the fruit juice and thereby separating therefrom a fibrous and fruity vegetable matter, the coagulated proteids and the filtration medium, and compressing them into a compact mass, together to constitute a fertilizing material.

3. The process of producing a fertilizer as a by-product which comprises coagulating the proteids contained in fruit juice and filtering the fruit juice and thereby separating therefrom the fibrous and fruity vegetable matter, the coagulated proteids and vegetable solid and fibrous matter, these together constituting a fertilizing material.

In testimony whereof I have signed my name to this specification.

MAXWELL O. JOHNSON.